Nov. 1, 1932.  M. BROZINCEVIC  1,885,508
AUTO OF SIX OR MORE WHEELS
Filed Oct. 13, 1928  2 Sheets-Sheet 2
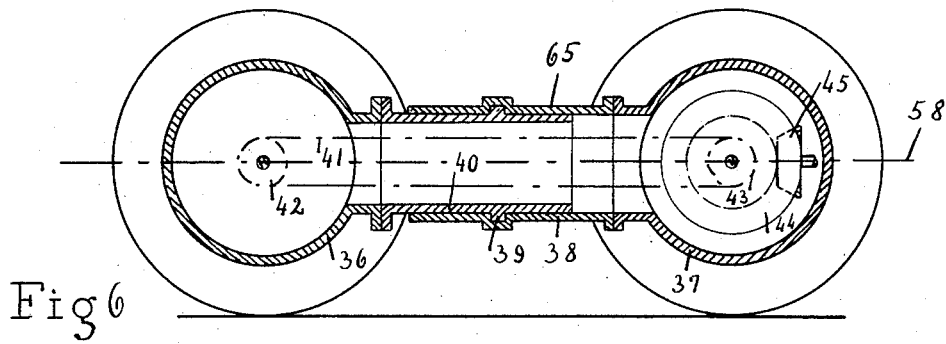
Fig 6
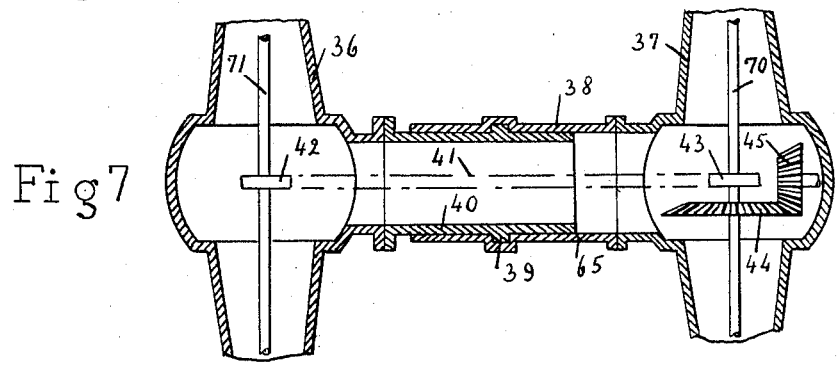
Fig 7
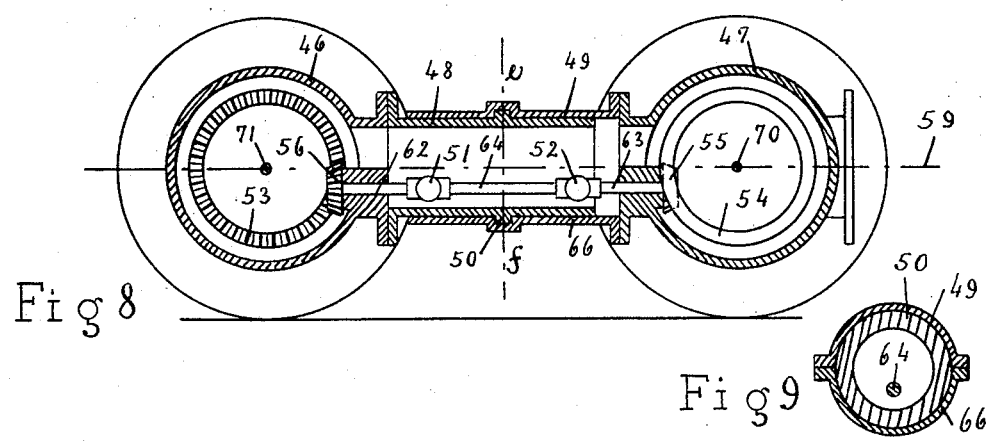
Fig 8
Fig 9
WITNESSES
INVENTOR Patented Nov. 1, 1932

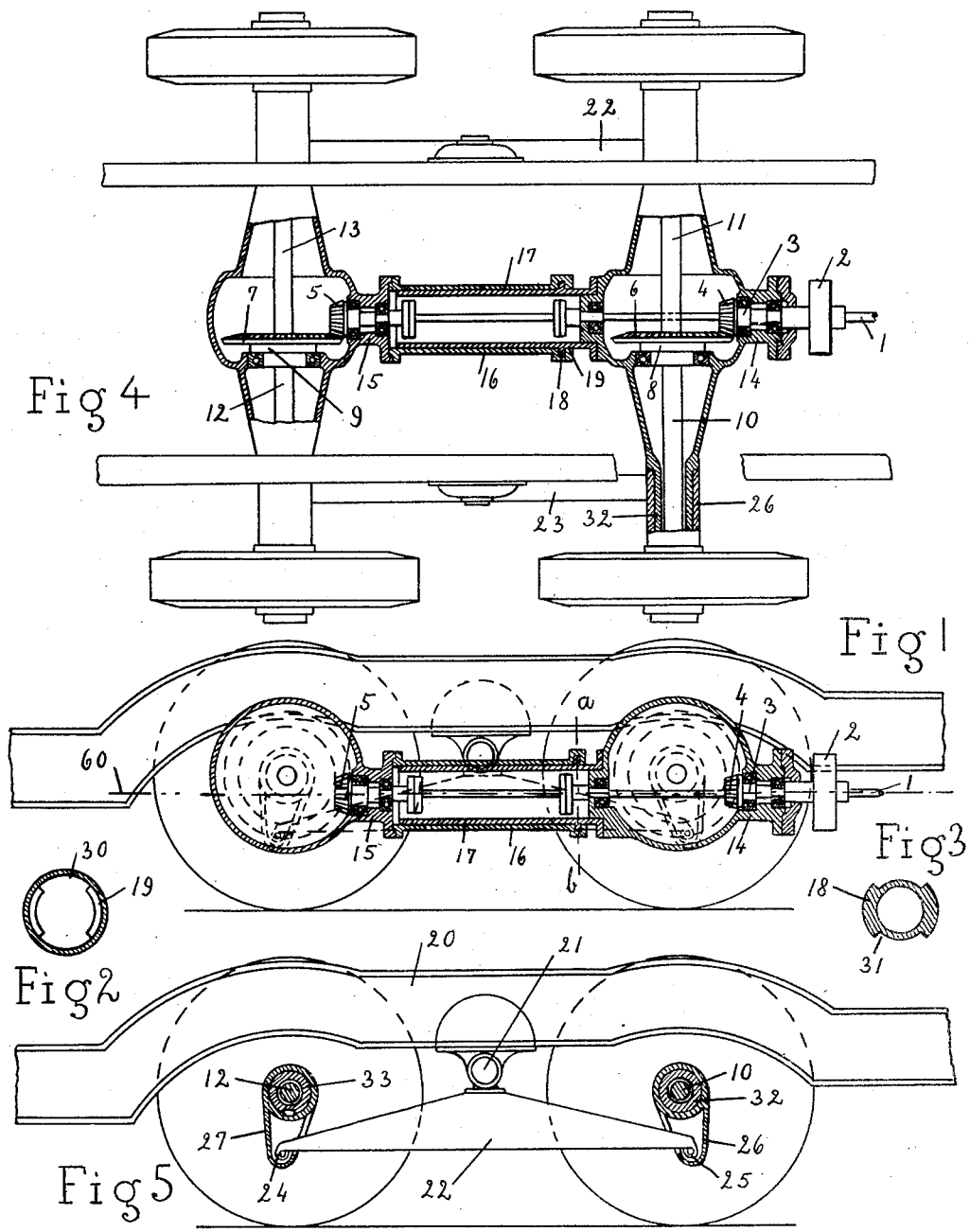

1,885,508

UNITED STATES PATENT OFFICE

MAX BROZINCEVIC, OF WETZIKON, SWITZERLAND

AUTO OF SIX OR MORE WHEELS

Application filed October 13, 1928, Serial No. 312,379, and in Germany and Switzerland October 28, 1927.

My invention relates to autos of six or more wheels and has for its object the driven two rear axles, which are connected together in such a way, that they are able to swing around the main shaft but cannot move lengthwise.

Reference is to be had to the accompanying drawings, in which

Figure 1 shows a vertical section through the two rear axles.

Figure 2 shows a section according to the line a—b of Figure 1. It shows the coupling disc of the outside connecting pipe.

Figure 3 shows a section according to the line a—b of Figure 1. It shows the coupling disc of the inner connecting pipe.

Figure 4 shows a bottom view of the two rear axles. At the same time a part section is shown.

Figure 5 shows a side view of the frame with the supporting springs. Several parts are shown as sections.

Figures 6 and 7 show a chain drive for the rear wheels.

Figure 8 shows a bevel gear drive with a swinging driving shaft.

Figure 9 shows a section according to line e—f of Figure 8.

The two rear axles 10, 11, 12, 13 are driven by shaft 1 which is driven by the changeable speed gears, which get their motion from the motor. The shaft 1 is connected to shaft 3 by a flexible coupling 2. In regard to the center of the wheels the shaft 3 is placed below it. The bevel gears 4, 5 are keyed to the shaft 3, which are in connection with the bevel gears 6, 7 according to Figure 4. As the latter shows the bevel gears 6, 7 transmit their motion to the differential gears 8, 9. As the latter are well known, no details are shown. From the differential gears the motion is transmitted to the shafts 10, 11 and 12, 13. The shafts 10, 11 carry the forward wheels and the shaft 12, 13 the back wheels. The driving mechanism, described above is placed into the cases 14, 15, which are connected together by pipes 16, 17. The pipe 17 is placed inside of pipe 16. These pipes carry corresponding offsets and slots on the section a—b. The Figure 2 shows the cut of the pipe 16 on section a—b and the pipe carries the offsets 19 and the slots 30.

Figure 3 shows the cut of pipe 17 on section a—b and the pipe carries the offsets 18 and the slots 31. The slots and offsets are so dimensioned that the offsets 18 can be pushed through the slots 30 and the offsets 19 through the slots 31 as soon as the pipe 17 is pushed into the pipe 16. When the pipes are turned, the offsets 18, 19 are placed behind each other and the pipes 16, 17 are fixed in the direction of the axle, whereby the pipes are able to turn around the shaft 3. Figure 5 shows the side view of the connection of both axles with the frame 20. The carrying springs 22, 23 are placed on both sides of the wagon and swing around the point 21. The ends 24, 25 of the springs are connected to the cases 14, 15 by the connecting pieces 26, 27. While the front connecting piece 26 turns around the neck 32 of the case 14, the rear connecting piece 27 is connected to the neck of the case 15 by a key. As the shaft of the driving mechanism is placed under the center of the wheels, the center of gravity of the whole wagon can be placed as low as possible, which is very important. The whole construction of the wagon makes it possible to meet all conditions of the road, as the pipes 16, 17 allow the turning of the wheels with respect to each other, around the centerline 60 of the driving shaft l. For instance while the rear pair of wheels may rest on a horizontal road, the pipes 16, 17 allow, that the front wheels may rest on an inclined road. The inclination of the road can be at a right angle to the direction of the drive. As the cases 14, 15 are connected unmovable in the direction of the longitudinal axis of the vehicle, the arrangement of the spring allows, that the connecting piece 26 swings around the neck 32, as soon as the spring is bent. As the springs 22, 23 are fixed on levers the rear axles are able to swing around the point 21, as the universal-joint allows the flexibility. Furthermore the fixing of the frame on levers in relation to the springs 22, 23 and the use of a universal joint 2 allow, that the two pairs of rear wheels also meet all conditions of the road. Therefore for instance the rear pair of wheels can stand higher than the front pair and also the front pair higher than the rear one.

According to Figures 6 and 7 the bevel gear 45 transmits the power from the motor to bevel gear 44, which is fixed to the shaft 70. The shaft 71 with chain wheel 42 is driven by the chain 41 and chain wheel 43, keyed to shaft 70. The shaft 71 and chain wheel 42 are placed inside of case 36 and case 37 carries the shaft 70 and the wheels 43, 44, 45. The pipe 40 with the offset 39 is fixed to the case 36 and the pipe 38, 65 is fastened to the case 37. Both pipes and cases can turn against each other as described according to Figure 1. The chain 41 is flexible, so that both cases 36, 37 can turn around the chain.

Fig. 8 shows only the cases and wheels, while the driving parts are left out. The whole construction is similar to the construction of Figure 1. While the bevel gear 56 lies on the left hand side of the bevel gear 53 the bevel gear 55 is placed on the right hand side of the bevel gear 54. The case 46 carries the pipe 48 with the offset 50 and the pipe 49, 66 is fixed to the case 47. The bevel gears 55, 56 are keyed to the shafts 62, 63 which are connected by the flexible couplings 51, 52 to the shaft 64. The centerline of the pipes 48, 49, 66 is 59 and the cases 46, 47 swing around the line 59. As the shaft 62 rests in the case 46 and the shaft 63 in the case 47, all parts 62, 63, 64 and 51, 52 swing around the centerline 59. The pipe, which is fastened to the case 47 is made from two halves 49, 66, as otherwise the pipe could not be placed around the pipe 48.

The idea of the invention can be constructed also differently from the constructions mentioned above, and the latter are explained only as examples.

I claim:

In a motor vehicle, the combination of a plurality of rear axle housings, an axle within each housing and carrying a bevel gear thereon, a torque tube disposed between and rigidly secured to each housing, a power shaft with a plurality of universal joints in said torque tube and below the plane of the axles whereby the power shaft extends beneath one axle, a drive shaft in alignment with said power shaft, a flexible coupling between said shafts, gears on said power shaft operatively associated with said bevel gears, said torque tube composed of two sleeves, one sleeve having outwardly projecting flanges and the other sleeve having lip portions arranged to detachably engage said flanges to allow swiveling movement between the sleeves but to rigidly hold the sleeves and axle housings against relative longitudinal displacement.

In testimony whereof I affix my signature.

MAX BROZINČEVIC.